(12) United States Patent
Il et al.

(10) Patent No.: US 12,141,122 B2
(45) Date of Patent: Nov. 12, 2024

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Yukinori Il, Toyota (JP); Kenji Yamaguchi, Miyoshi (JP); Junya Ogawa, Okazaki (JP); Yuki Naganuma, Nagoya (JP); Junya Yamamoto, Seto (JP); Yuta Tone, Nagoya (JP); Naoki Ishizuka, Nagoya (JP); Tadayuki Tanaka, Nagoya (JP); Keisuke Ito, Toyota (JP); Yuka Yokoi, Okazaki (JP); Takashi Hayashi, Miyoshi (JP); Naoya Oka, Nagakute (JP); Yu Hamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 17/733,202

(22) Filed: Apr. 29, 2022

(65) Prior Publication Data
US 2022/0382738 A1 Dec. 1, 2022

(30) Foreign Application Priority Data
May 31, 2021 (JP) .................................. 2021-091560

(51) Int. Cl.
*G06F 16/23* (2019.01)
*B60R 13/00* (2006.01)

(52) U.S. Cl.
CPC .......... *G06F 16/2365* (2019.01); *B60R 13/00* (2013.01)

(58) Field of Classification Search
CPC ..... G06F 16/2365; B60R 13/00; B60R 13/10; Y02P 90/30
See application file for complete search history.

(56) References Cited

U.S. PATENT DOCUMENTS

| 10,607,179 | B1 * | 3/2020 | Lee .................... G06Q 10/0838 |
| 2002/0178154 | A1 * | 11/2002 | Shirota .................. G06Q 30/06 |
| 2008/0189325 | A1 * | 8/2008 | Hanses .............. G05B 19/4183 |
| 2014/0272237 | A1 * | 9/2014 | Roper .................... C09D 5/008 |
| | | | 428/419 |
| 2022/0308535 | A1 * | 9/2022 | Sahu .................... G05B 13/042 |
| 2022/0374411 | A1 * | 11/2022 | Bailey ............... G06F 16/24532 |

FOREIGN PATENT DOCUMENTS

| JP | 2002-149774 A | 5/2002 |
| JP | 2003-050918 A | 2/2003 |
| JP | 2010-009572 A | 1/2010 |
| JP | 2017-027374 A | 2/2017 |

* cited by examiner

*Primary Examiner* — Mohammad Ali
*Assistant Examiner* — Sheela Rao
(74) *Attorney, Agent, or Firm* — Oliff PLC

(57) ABSTRACT

An information processing apparatus comprises a data base configured to store, for a predetermined vehicle, a history of coating operation which is operation related to coating using a coating film containing an easily removable layer; and a controller configured to: acquire operation data representing details on the coating operation that is performed on the vehicle, and update the data base based on the operation data.

18 Claims, 16 Drawing Sheets

VEHICLE DATA

| VEHICLE ID | VEHICLE TYPE ID | DATE OF MANUFACTURE | VEHICLE BODY COLOR | HISTORY DATA |
|---|---|---|---|---|
| V001 | T001 | ... | C001 | ... |
| V002 | T002 | ... | C001 | ... |
| V003 | T003 | ... | C001 | ... |
| ... | | | | ... |

FIG. 3A

HISTORY DATA (V001)

| DATE OF OPERATION | VEHICLE SERVICE LOCATION | ORDERER | TYPE OF WORK | DETAILED INFORMATION ON COATING |
|---|---|---|---|---|
| 2019/4/1 | F001 | USER A | TOP COATING | REMOVABLE LAYER + BASE (C011) + CLEAR |
| 2021/2/1 | F001 | DEALER A | REMOVAL | - |
| 2022/3/1 | F001 | USER B | TOP COATING | REMOVABLE LAYER + BASE (C012) + CLEAR |
| ... | | | | ... |

FIG. 3B

OPERATION DATA

| VEHICLE ID | V001 |
|---|---|
| DATE OF OPERATION | 2021/4/5 |
| VEHICLE SERVICE LOCATION | F001 |
| TYPE OF WORK | TOP COATING |
| DETAILED INFORMATION ON COATING | REMOVABLE LAYER/BASE (C002)/CLEAR |
| ORDERER | VEHICLE OWNER |

FIG. 4A

OPERATION DATA

| VEHICLE ID | V001 |
|---|---|
| DATE OF OPERATION | 2024/4/1 |
| VEHICLE SERVICE LOCATION | F001 |
| TYPE OF WORK | REMOVAL |
| DETAILED INFORMATION ON COATING | COATING REMOVAL BY WATER PRESSURE |
| ORDERER | USED CAR DEALERSHIP X |

FIG. 4B

OPERATION DATA

| VEHICLE ID | V001 |
|---|---|
| DATE OF OPERATION | 2022/2/1 |
| VEHICLE SERVICE LOCATION | F001 |
| TYPE OF WORK | REPAIR |
| DETAILED INFORMATION ON COATING | REMOVABLE LAYER/BASE (C002)/CLEAR |
| PART TO REPAIR | RIGHT FRONT DOOR |
| REPAIR METHOD | REMOVE COATING AND RE-COAT |
| ORDERER | VEHICLE OWNER |

DETAILED INFORMATION ON COATING

- 1st Layer: REMOVABLE LAYER
- 2nd Layer: BASE LAYER (COLOR CODE C011)
- 3rd Layer: CLEAR LAYER

[ADD] [DELETE]

[NEXT]

FIG. 8B

DETAILED INFORMATION ON COATING

- 1st Layer: REMOVABLE LAYER
- 2nd Layer: BASE LAYER (COLOR CODE C001)
- 3rd Layer: BASE LAYER (COLOR CODE C011)
- 4th Layer: CLEAR LAYER

[ADD] [DELETE]

[NEXT]

COATING HISTORY
INFORMATION
(VEHICLE NUMBER: XXXXX)

| 1st History | 2021/4/1 MANUFACTURE OF NEW VEHICLE VEHICLE BODY COLOR: WHITE PEARL |
| 2nd History | 2021/4/5 TOP COATING VEHICLE BODY COLOR: PASSION RED |
| 3rd History | 2022/2/1 REPAIR OF TOP COATING RE-COATING OF RIGHT FRONT DOOR ONLY |
| 4th History | 2024/4/1 REMOVAL OF TOP COATING |

CURRENT VEHICLE BODY COLOR [WHITE PEARL]
CURRENT COATING STATUS [NORMAL COATING]

[COMPLETE]

FIG. 12A

COATING HISTORY
INFORMATION
(VEHICLE NUMBER: XXXXX)

| 1st History | 2021/4/1 MANUFACTURE OF NEW VEHICLE VEHICLE BODY COLOR: WHITE PEARL |

DATE OF SHOOTING: 01/04/2021

[COMPLETE]

FIG. 12B

OPERATION DATA

| VEHICLE ID | V001 |
|---|---|
| DATE OF OPERATION | 2021/4/5 |
| VEHICLE SERVICE LOCATION | F001 |
| TYPE OF WORK | TOP COATING |
| DETAILED INFORMATION ON COATING | REMOVABLE LAYER/BASE (C002)/CLEAR |
| ORDERER | VEHICLE OWNER |
| STATUS DATA | (COLOR CODE BEFORE COATING) C011 — 1301 |

FIG. 13

```
COATING HISTORY
INFORMATION
 (VEHICLE NUMBER: XXXXX)

1st History      2016/3/1 MANUFACTURE OF NEW VEHICLE
                 VEHICLE BODY COLOR: BLACK MICA 2nd History      2016/4/1 TOP COATING
                 VEHICLE BODY COLOR: WHITE PEARL          ╱ 1601

3rd History      HISTORY IS UNKNOWN DURING THIS PERIOD

4th History      2020/5/1 REMOVAL OF TOP COATING

CURRENT VEHICLE BODY COLOR [GRAY METALLIC]
            CURRENT COATING STATUS [TOP COATING]

[ COMPLETE ]
```

FIG. 16

INFORMATION PROCESSING APPARATUS AND INFORMATION PROCESSING METHOD

CROSS REFERENCE TO THE RELATED APPLICATION

This application claims the benefit of Japanese Patent Application No. 2021-091560, filed on May 31, 2021, which is hereby incorporated by reference herein in its entirety.

BACKGROUND

Technical Field

This disclosure relates to the management of vehicles.

Description of the Related Art

A system is known for centrally managing information on the maintenance of cars.

A related invention which is a system in which information on the cars of customers visiting service stations is held in association with the numbers on their license plates is disclosed, for example, in Japanese Patent Laid-Open No. 2017-027374.

SUMMARY

An object of the present disclosure is to centrally manage information on vehicle coating.

The present disclosure in its one aspect provides an information processing apparatus comprising: a data base configured to store, for a predetermined vehicle, a history of coating operation which is operation related to coating using a coating film containing an easily removable layer; and a controller configured to: acquire operation data representing details on the coating operation that is performed on the vehicle, and update the data base based on the operation data.

The present disclosure in its another aspect provides an information processing method comprising the steps of: obtaining operation data representing details on coating operation performed on a predetermined vehicle using a coating film including an easily removable layer; and updating, based on the operation data, a data base storing the history of the coating operation for each vehicle.

Another aspect of the present disclosure is a program for causing a computer to perform the aforementioned information processing method, or a computer-readable non-transitory memory medium storing the program.

The present disclosure makes it possible to centrally manage information on vehicle coating.

BRIEF DESCRIPTION OF THE DRAWINGS

FIGS. 3A and 3B illustrate examples of data stored in a contract management server;

FIGS. 4A to 4C illustrate examples of operation data sent from the service location server;

FIGS. 8A and 8B are examples of a screen provided by the service location server;

FIGS. 12A and 12B illustrate an example of a screen for reference to a coating history in the first embodiment;

FIG. 13 is an example of operation data in the second embodiment;

FIG. 16 illustrates an example of a screen for reference to a coating history in the second embodiment.

DESCRIPTION OF THE EMBODIMENTS

Figure 1:
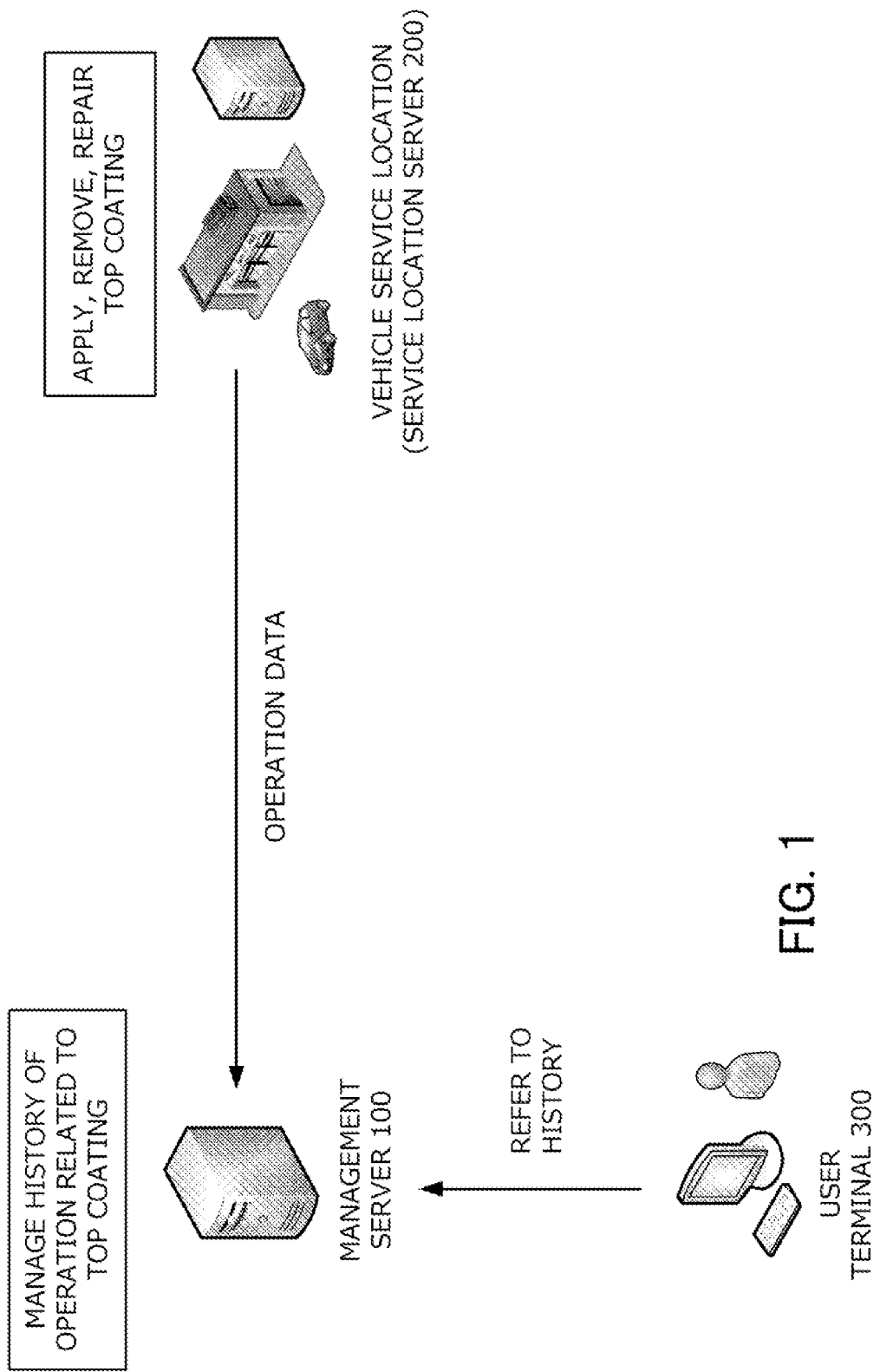
FIG. 1 is a diagram for explaining the overview of a vehicle management system.

There is a technique for applying a removable paint to a vehicle body, using a coating film that includes an easily removable layer. With such a coating film, which can be easily removed, the vehicle body color can be changed at any time. This allows a popular body color in the used car market to be selected at the time of purchase, for example, so that the buyer can coat it with the color of his/her choice and return it to the original color when it is sold.

Besides, since the original coating film is protected by top coating, the value of the used car can be increased compared to without top coating.

In this document, the term "top coating" refers to the formation of a second coating film, including an easily removable layer, on the first coating film that the vehicle has. The second coating film is a coating film of one or more layers that can be removed after. The term "(coating) removal" refers to the removal (peeling) of the second coating film. The term "top coating" refers to a removable coating overpainted on an existing coating film using a coating film that includes an easily removable layer.

In this document, the term "coating film" refers to a film of paint applied in the process of coating, a removable film, or their combination.

With the spread of such systems that can easily apply a top coating for the coating, estimation of the history of the vehicle based on the appearance of the vehicle body alone is expected to become difficult. For example, for a vehicle that is sold second-hand, it is difficult to determine at a glance whether it has been coated differently from the original body color or not. Besides, there is the risk that the condition and appearance of the vehicle do not match because the vehicle appears to be as good as new immediately after removal of the top coating. In addition, since the coating film including the easily removable layer can be removed by applying force, if the condition of the coating is not properly recognized, it is expected that the use of a car wash or high-pressure washer will cause troubles.

The information processing apparatus of the present disclosure solves such problems.

An information processing apparatus according to a first aspect of the present disclosure includes: a data base configured to store, for a predetermined vehicle, a history of coating operation which is operation related to coating using a coating film containing an easily removable layer; and a controller configured to: acquire operation data representing the details on the coating operation that was performed on the vehicle, and update the data base based on the operation data.

An "easily removable layer" refers to a layer that can be applied to a vehicle body and can be removed after. A coating film that includes an easily removable layer may be, for example, a combination of a film-like removable film and a normal coating film, or the colored coating film itself may be removable (easily removable paint).

Forming a coating film including an easily removable layer on the vehicle's original coating film allows the top coating to be removed after (i.e., the vehicle body color to be restored).

The data base stores the history of coating operation, which is operation related to coating using a coating film including an easily removable layer. Coating operation can be at least one of the following types of operation: top-coating a coating film including an easily removable layer over a vehicle with a predetermined body color; and removing (peeling) the coating film.

The information processing apparatus updates the data base based on operation data externally acquired. With such a configuration, top coating and removal of the top coating performed on a predetermined vehicle can be recorded.

In addition, the operation data may include information on the composition of the second coating film.

The information on the composition of the second coating film may be, for example, detailed information on the paint used for top-coating or on the overpainting order.

The data base may be associate the identifier of the vehicle and the history of coating operation performed on the vehicle after the vehicle was manufactured.

This makes it possible to create a data base of the history of all coating operation performed on the vehicle since it was new.

Further, the operation data may include data regarding the current status of the vehicle before the coating operation and the controller may determine whether the latest history associated with the vehicle is consistent with the current status of the vehicle.

The data regarding the current status of the vehicle may be, for example, the current coating color of the vehicle, or an external image of the vehicle. With this configuration, whether or not the details managed in the data base are consistent with the actual vehicle can be determined.

Further, the controller may generate data to notify the user, if the latest history associated with the vehicle is not consistent with the current status of the vehicle.

Further, the controller may add, if the latest history associated with the vehicle is not consistent with the current status of the vehicle, a record stating that the history of coating operation for the vehicle up to the present time is unknown to the data base.

This configuration prevents the history from being added while the data base and the status of the actual vehicle are not consistent.

Further, the data base may be data that is further associated with the identifier of the service location where the coating operation was performed.

Further, the data base may be data that is further associated with information on the orderer of the coating operation.

The service location where the coating operation was performed is, for example, a vehicle manufacturing plant, a maintenance plant, or a car dealer. The orderer is the person who ordered the coating operation. This makes it possible to record the background against which the coating operation was performed. The operation data may be received from the device corresponding to the aforementioned service location.

Further, the controller may search, in response to an inquiry from an external device, the data base for the history of the coating operation for a first vehicle and transmit the obtained results to the external device.

The external device may be, for example, a device used by a business operator that buys and sells the first vehicle, or a device used by a user who is considering purchasing the first vehicle. With such a configuration, the coating history related to the vehicle can be shown to any user.

Further, the data base may be data that is further associated with a photograph of the first vehicle after the coating operation.

The controller may further transmit the photograph of the first vehicle to the external device.

Saving an image showing the appearance of the vehicle each time coating operation occurs makes it possible to check the appearance of the vehicle at any point in the past.

Specific embodiments of the present disclosure will be described below with reference to the drawings. The hardware configuration, module configuration, functional configuration, and the like described in each embodiment are not intended to limit the technical scope of the disclosure to those alone, unless otherwise stated.

First Embodiment

An overview of the vehicle management system according to the first embodiment will be described with reference to FIG. 1.

The vehicle management system according to this embodiment includes a management server 100 that manages vehicles, a service location server 200 corresponding to a vehicle service location, and a user terminal 300.

The management server 100 is a device that manages vehicles that are manufactured by a manufacturer and supplied to users. A vehicle to be managed can be subjected to coating operation at a predetermined vehicle service location. Coating operation includes, for example, (1) forming a second coating film of an easily removable paint on the first coating film (e.g., the original coating film) over the vehicle, or (2) removing the second coating film from the vehicle. Forming or removing the second coating film at the vehicle service location allows the color of the vehicle body to be changed.

The management server 100 has a data base that records the history of coating operation performed in the past (hereinafter referred to as "coating history") for multiple vehicles under management.

The service location server 200 is a server device associated with a vehicle service location where coating operation is performed on vehicles. Vehicle service locations are, for example, vehicle manufacturing plants, maintenance plants, car dealers, and the like. When the service location server 200 performs coating operation on a predetermined vehicle, it generates data indicating the details of the coating operation (hereinafter referred to as "operation data") and sends it to the management server 100. In this way, the data base is updated.

The user terminal 300 is a computer used by users who buy and sell vehicles under the management of the system. The user can access the management server 100 via the user terminal 300 and inquire about the coating history of a given vehicle (e.g., a vehicle that is being considered for purchase as a used vehicle).

The user terminal 300 may be a computer owned by the user, or a computer installed in a dealer's store (e.g., a used car dealership).

Figure 2:
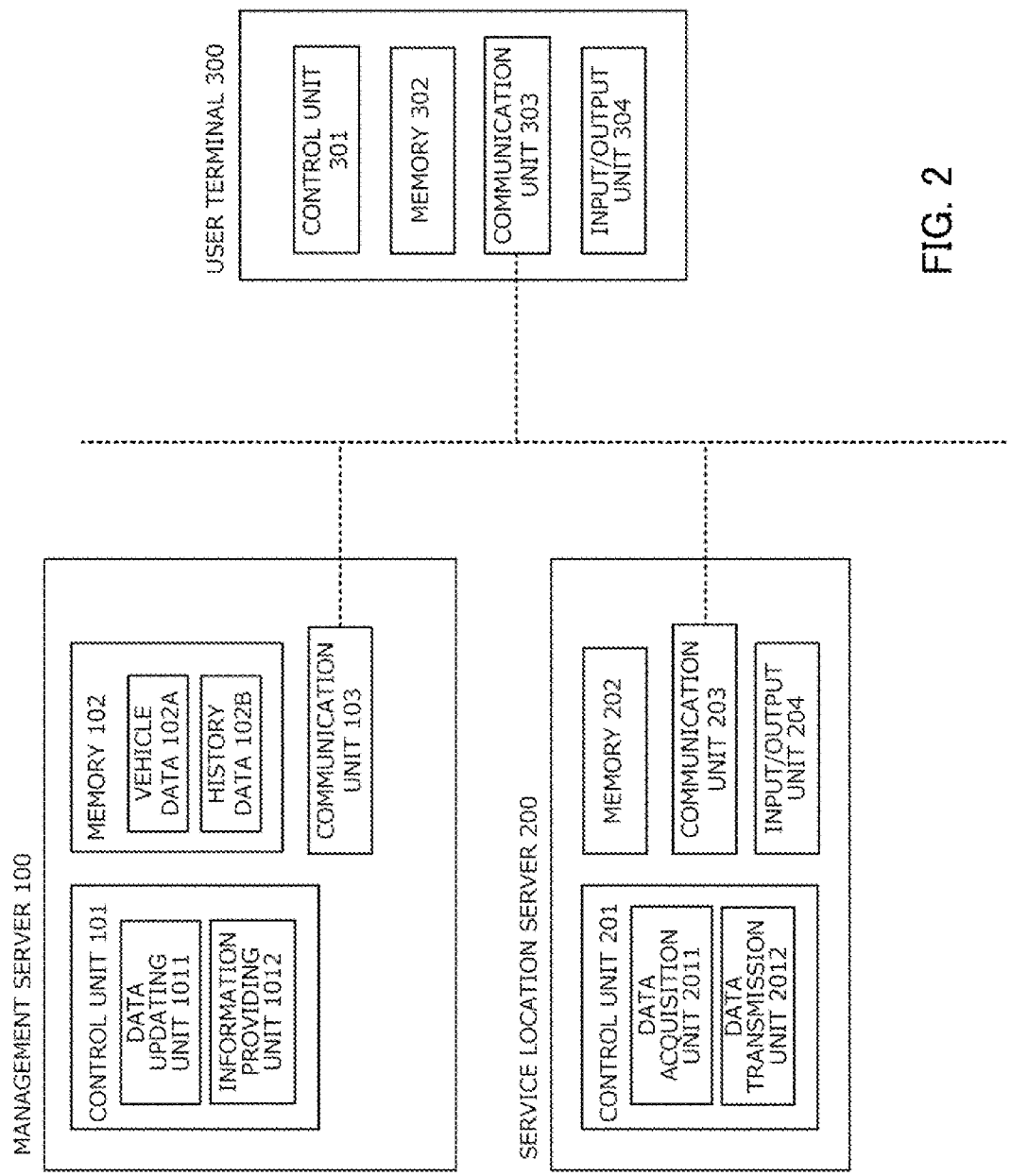
FIG. 2 is a diagram for explaining the configuration of a management server, service location server, and user terminal.

FIG. 2 illustrates the components more specifically: the management server 100, service location server 200, and user terminal 300 included in the vehicle management system according to this embodiment. In this section, the user terminal 300 will be described first.

The user terminal 300 is a computer used by an individual, such as a personal computer, smartphone, cell phone, tablet computer, and personal information terminal. The user terminal 300 includes a controller 301, a memory 302, a communication unit 303, and an input/output unit 304.

The controller 301 is an arithmetic device that controls the control performed by the user terminal 300. The controller 301 can be implemented using an arithmetic processing device such as a central processing unit (CPU).

The controller 301 executes the function of accessing and interacting with the management server 100. The function may be implemented using a web browser running on the user terminal 300, or using a dedicated application software.

The memory 302 includes a main memory and an auxiliary memory. The main memory is a memory in which programs to be executed by the controller 301 or data to be used for the control programs is expanded. The auxiliary memory stores programs to be executed by the controller 301 or data to be used for the control program. The auxiliary memory may store, in the form of applications, a package of programs to be executed in the controller 301. It may also store an operating system for executing these applications. The programs stored in the auxiliary memory are loaded into the main memory and executed by the controller 301 to perform processing explained below.

The main memory may include a random access memory (RAM) or read only memory (ROM). The auxiliary memory may include an erasable programmable ROM (EPROM) or hard disk drive (HDD). In addition, the auxiliary memory may include removable media, i.e., a portable recording medium.

The communication unit 303 is a wireless communication interface for connecting the user terminal 300 to a network. The communication unit 303 is configured to be communicative with the management server 100 via, for example, a wireless LAN, 3G, LTE, 5G, or other mobile communication services.

The input/output unit 304 is a unit that accepts input operations performed by the user and presents information to the user. The input/output unit 304 consists of, for example, a single touch panel display. The input/output unit 304 may consist of a liquid crystal display and its controller therefor, and a touch panel and its controller.

The management server 100 will now be described.

The management server 100 stores a data base for managing the coating history for multiple vehicles under management. It also updates the data base based on the operation data received from the service location server 200. In addition, the management server 100 searches the data base in response to an inquiry from the user terminal 300 and acquires and provides the coating history for a predetermined vehicle.

In this embodiment, the management server 100 may be configured to be able to run a web server for interaction with the service location server 200 and the user terminal 300. In this case, for example, the service location server 200 and the user terminal 300 can input and output information by accessing the web service using a browser. Note that the management server 100 may provide services via means other than a web server. For example, the management server 100 may provide a service for interaction with dedicated application software installed on the service location server 200 or user terminal 300 through a predetermined protocol.

The management server 100 can be a general-purpose computer. In other words, the management server 100 can be a computer including a processor, such as a CPU and GPU, a main memory, such as RAM and ROM, and an auxiliary memory, such as an EPROM, hard disk drive, and removable medium. The auxiliary memory stores an operating system (OS), various programs, various tables, and the like and loads the programs stored therein into the working area of the main memory and executes it so that each component or the like is controlled through execution of the programs, thereby achieving the functions that meet predetermined purposes described below. Note that some or all of the functions may be achieved by hardware circuits such as ASICs and FPGAs.

The management server 100 includes a controller 101, a memory 102, and a communication unit 103.

The controller 101 is an arithmetic device that controls the control performed by the management server 100. The controller 101 can be implemented using an arithmetic processing device such as a CPU.

The controller 101 includes two functional modules: a data updating unit 1011 and an information providing unit 1012. Each functional module may be implemented by executing the stored program by the CPU.

The data updating unit 1011 updates the data base that stores the coating history related to the vehicle based on the data received from the service location server 200. The data updating unit 1011 performs one of the following processes.

(1) When a vehicle is newly manufactured, create a new data base for the vehicle.
(2) When operation data is received from the service location server 200, a record corresponding to its details is added to the corresponding data base.

When a vehicle is newly manufactured, the vehicle has its original vehicle body color. On the contrary, for a vehicle that has undergone coating operation, a top coating is applied, which changes its vehicle body color. The vehicle body color also changes when the top coating is removed.

Since the database holds the entire history of coating operation since the new vehicle was manufactured, a third party can obtain information on the current state of the coating on a given vehicle by referring to the database. The details of the database will be described later.

The information providing unit 1012 responds to a request obtained from the user terminal 300, acquires the coating history related to the specified vehicle, and provides it to the user terminal 300.

The memory 102 includes a main memory and an auxiliary memory. The main memory is a memory in which programs to be executed by the controller 101 or data to be used for the control program is expanded. The auxiliary memory stores programs to be executed by the controller 101 or data to be used for the control program.

The memory 102 stores vehicle data 102A and history data 102B.

The vehicle data 102A is information that is unique to each of the vehicles under management.

FIG. 3A is an example of vehicle data 102A. As shown in the drawings, the vehicle data 102A includes the identifier of the vehicle, the identifier of the vehicle model, the date of manufacture, the identifier of the vehicle body color, and a pointer to the history data. The vehicle body color refers to the original vehicle body color of the vehicle.

The history data 102B is a set of data representing the history of coating operation performed on a particular vehicle. FIG. 3B illustrates an example of the history data 102B.

In this embodiment, coating operation refers to one of the following: (1) applying top coating of an easily removable paint, (2) removing the easily removable paint, and (3) repairing the coating of the easily removable paint. History data 102B is generated for each vehicle, and one record corresponds to one coating operation. Upon reception of operation data from the service location server 200 (i.e., when coating operation is performed on a certain vehicle), a record corresponding to the coating operation is newly added to the history data 102B related to the vehicle.

The history data 102B includes the date of the coating operation, the vehicle service location where the coating operation was performed, the orderer of the coating operation, and the type of work (type of coating operation, i.e., any one of (1) to (3) mentioned above), and detailed information on the coating. The detailed information on the coating is, for example, the information on what kind of coating was applied to which layer.

Each piece of the aforementioned data may be constructed by a program of a data base management system (DBMS) executed by a processor to manage the data stored in the memory. In this case, each piece of data may be, for example, a relational data base.

The communication unit 103 is a communication interface for connecting the management server 100 to a network. The communication unit 103 includes, for example, a network interface board and a wireless communication interface for wireless communication.

The service location server 200 will now be described.

The service location server 200 is a device installed at the service location where vehicle coating operation is performed, and when the coating operation is performed on a vehicle, the data regarding the details on the coating operation is sent to the management server 100.

Coating operation is performed, for example, when an order is placed by the user. If the target vehicle is a leased vehicle, the coating may be removed when the vehicle is returned, and the original vehicle body color may be restored. In addition, the coating on the vehicle that was purchased as a used vehicle may be removed according to an instruction from the dealer.

Note that the service location server 200 may be installed at the service location where vehicles are manufactured (manufacturing service location). When a vehicle is newly manufactured, the service location server 200 may notify the management server 100 of that fact. This may trigger the creation of a data base for the new vehicle.

Like the management server 100, the service location server 200 can be a general-purpose computer. In other words, the service location server 200 can be a computer including a processor, such as a CPU and GPU, a main memory, such as RAM and ROM, and an auxiliary memory, such as an EPROM, hard disk drive, and removable medium.

The service location server 200 includes a controller 201, a memory 202, and a communication unit 203, and an input/output unit 204.

The controller 201 is an arithmetic device that controls the control performed by the service location server 200. The controller 201 can be implemented using an arithmetic processing device such as a CPU.

The controller 201 includes two functional modules: a data acquisition unit 2011 and a data transmission unit 2012. Each functional module may be implemented by executing the stored program by the CPU.

The data acquisition unit 2011 generates operation data based on the details on the input from the staff at the vehicle service location. FIG. 4A illustrates the details on the operation data.

As shown in the drawing, the operation data includes the following fields: vehicle identifier, date of operation, vehicle service location, type of work, detailed information on the coating, and orderer.

The vehicle identifier is an identifier that uniquely identifies the vehicle to undergo operation (e.g., a chassis number or vehicle identification number (VIN)). The date of operation is the date when the operation was performed, and the vehicle service location is an identifier that uniquely identifies the vehicle service location where the coating operation was performed. In the type of work, any one of "top coating (of coating)," "removal (of top coating)," and "repair (of top coating)" is stored.

The detailed information on the coating is a field in which information on the details of the coating is stored.

To be specific, it stores the characteristics of the paint (whether it is removable or not), information on the color (e.g., color number), whether or not overpainting is adopted, the order of overpainting, and whether or not additional layers (e.g., clear) are applied.

The orderer is a field in which the identifier of the person who ordered the coating operation is stored. For example, if the coating operation is carried out at the request of the vehicle owner, the identifier of the owner is stored; and if the coating operation is carried out at the discretion of the dealer, the identifier of the dealer is stored.

FIGS. 4A and 4B are examples of the operation data generated when top coating and removal of the top coating are carried out.

Operation data is also generated when the coating is repaired. FIG. 4C illustrates an example of operation data obtained when the type of work is "repair". In this example, in addition to the aforementioned example, data (reference numeral 401) regarding the part to be repaired and the method of repair is added. For example, for the "right front door", data notifying that "the coating was removed and re-coating was performed" is added.

These operation data can be generated based on the information input via the input/output unit 204 described below.

In the case where the service location server 200 is a device corresponding to the manufacturing service location for a vehicle, the service location server 200 may generate, instead of the operation data, data for notifying the management server 100 that the vehicle was newly manufactured. Such data is referred to as notification data. The notification data may include vehicle identifier, date of manufacture of the vehicle, the location where the vehicle was manufactured, and detailed information on the vehicle body color.

The data transmission unit 2012 sends the operation data (or notification data) generated by the data acquisition unit 2011 to the management server 100.

The memory 202 includes a main memory and an auxiliary memory. The main memory is a memory in which programs to be executed by the controller 201 or data to be used for the control program is expanded. The auxiliary memory stores programs to be executed by the controller 201 or data (including operation data and notification data) to be used for the control program.

The communication unit 203 is a communication interface for connecting the service location server 200 to a network. The communication unit 203 includes, for example, a network interface board and a wireless communication interface for wireless communication.

The input/output unit 204 accepts input operations performed by the user and presents information to the user. The input/output unit 204 may include, for example, an interface to an external display, a keyboard, and a mouse.

The configuration in FIG. 2 is merely illustrative, and all or part of the illustrated functions may be implemented using specially designed circuits. Programs may be stored and executed using a combination of main and auxiliary memories other than those illustrated in the drawing.

Figure 5A:
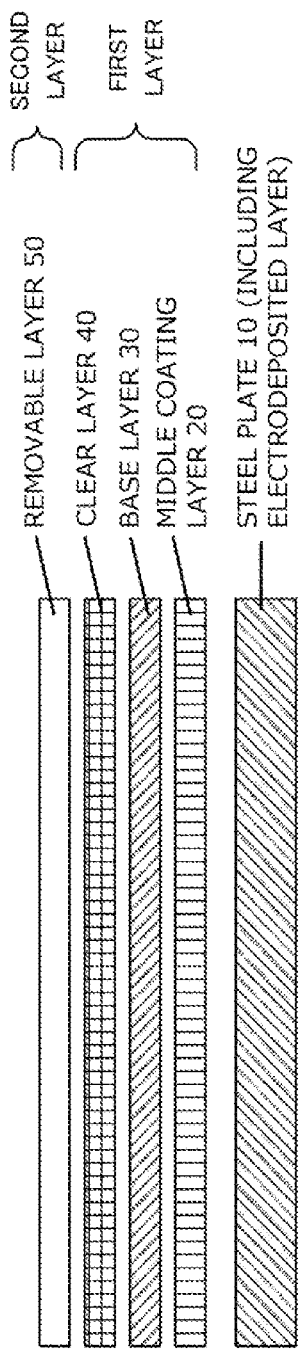
FIGS. 5A and 5B are diagrams of the overview of coating with an easily removable paint.

A brief description of the easily removable paint will now be given. FIG. 5A is a schematic cross-sectional view of a body member (e.g., a steel plate) of a vehicle body and a coating film applied to the body member. As shown in the drawing, the body member includes a steel plate 10 metal-processed to include an electrodeposited layer, a middle coating layer 20 on the electrodeposited layer, a base layer 30, and a clear layer 40.

These layers correspond to the first layer of coating (the original coating).

On the outer surface of the body member, a removable layer 50 resides as the second layer of coating. The removable layer 50 is a layer of easily removable paint, and has the property that it can be easily removed by applying force, compared to a normal coating film. The removable layer 50 is the "easily removable layer" in this disclosure, and the coating film illustrated as the second layer is the "coating film including the easily removable layer." The removable layer 50 is formed by coating the body member with an easily removable paint by, for example, a spraying method. Examples of the easily removable paint include paints containing xylene, ethylbenzene, antioxidants, methyl ethyl ketone, silica reactants, titanium oxide (nanoparticles), and an organic solvent.

The vehicle can be top-coated with the easily removable paint at a predetermined vehicle service location. This allows the vehicle's body color to be easily changed (i.e., from the first body color to the second body color). The same applies to removal of the removable layer 50. Removal of the removable layer 50 at a predetermined vehicle service location allows the vehicle's body color to be restored to the original one (i.e., from the second body color to the first body color).

Note that, although a steel plate is illustrated as a body member in this example, the body member may be a resin member. In this case, the middle coating layer 20 serves as a primer layer. In addition, a clear layer may be further provided on the removable layer 50.

Figure 5B:
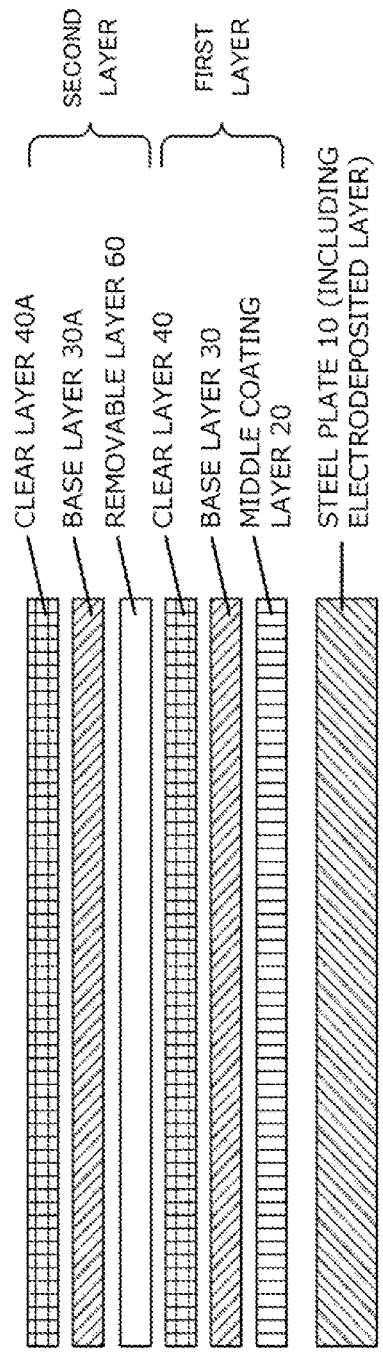

Note that, although the example in FIG. 5A is one in which the paint itself is made easily removable, a normal coating may be applied on a layer that is easily removable. For example, as shown in FIG. 5B, an uncolored removable layer 60 may be formed using the same material as the removable layer 50, and a base layer 30A and a clear layer 40A may be formed on the removable layer 60. The base layer 30A is a layer of a paint having a different color from the base layer 30. In this mode also, the layer of paint can be taken off by removing the removable layer 60. In this case, the removable layer 60 serves as the "easily removable layer" in the present disclosure, and the coating film illustrated as the second layer serves as the "coating film including the easily removable layer".

Note that, although a single color is illustrated for the color of the vehicle body and the color of the top coating in this example, a coating in multiple colors may be applied instead. For example, the vehicle body color may be multiple colors arranged in a predetermined pattern. In addition, "color" herein may be expressed not only by a single layer, but also by multiple layers of paint or material. The multiple layers may include, for example, a clear layer, a glass flake layer, a mica layer, and a pearl layer.

A top coating may be applied on at least a portion of the original coating. In other words, the top coating does not have to cover all the original coating. For example, if the original vehicle body color is black, applying a blue top coating on part of it yields a two-tone vehicle in black and blue.

The details of the processing performed by each device included in the vehicle management system will now be explained.

Figure 6:
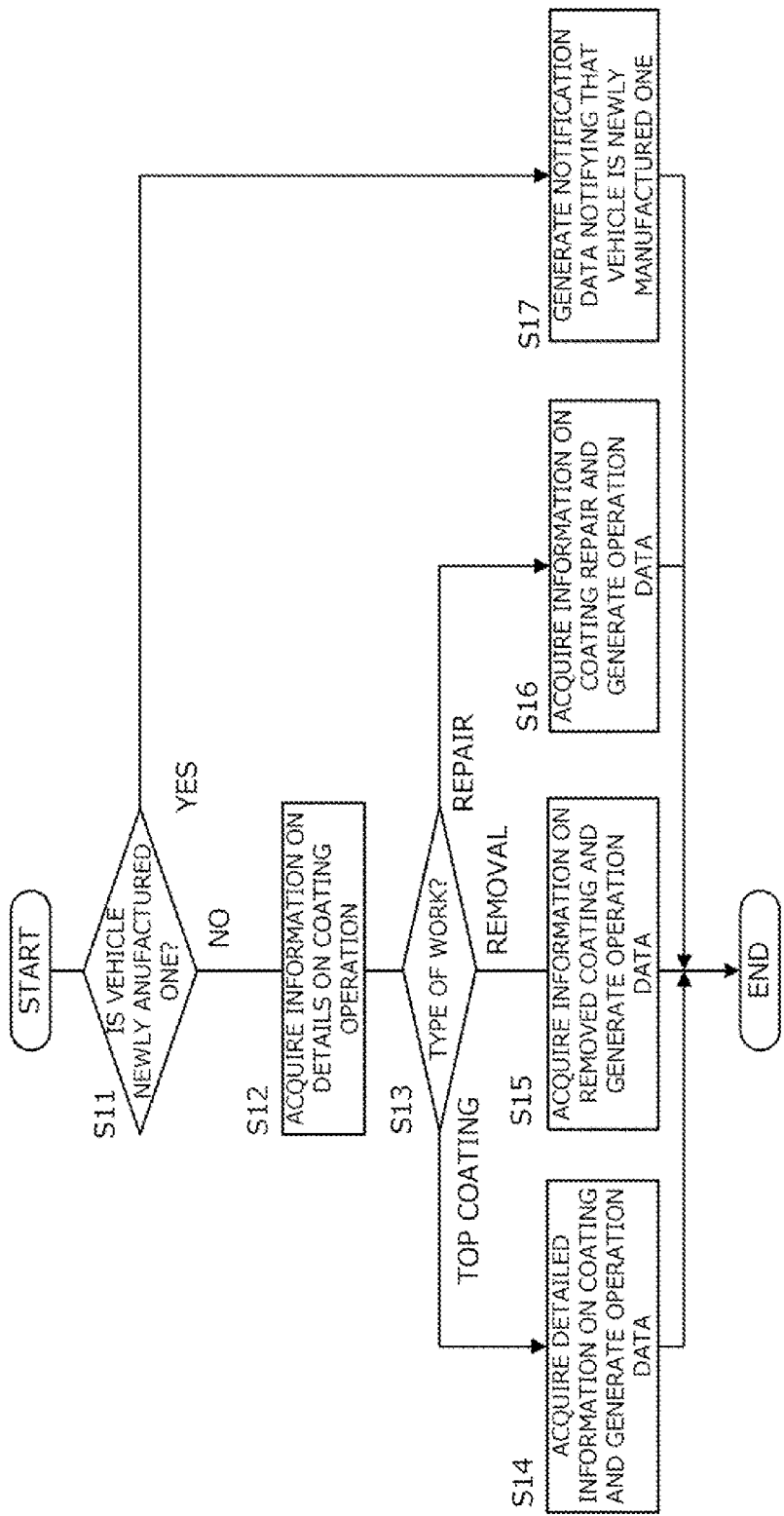
FIG. 6 is a flowchart of processing executed in the service location server.

FIG. 6 is a flowchart of processing executed in the service location server 200 (data acquisition unit 2011). The processing shown in FIG. 6 is carried out when a vehicle is coated at a predetermined vehicle service location.

First, in Step S11, whether or not the target vehicle is a newly manufactured one is determined. If the target vehicle is a newly manufactured one, the processing proceeds to Step S17 to generate notification data for notifying that the vehicle is a newly manufactured one.

Otherwise, the processing proceeds to Step S12.

Figure 7:
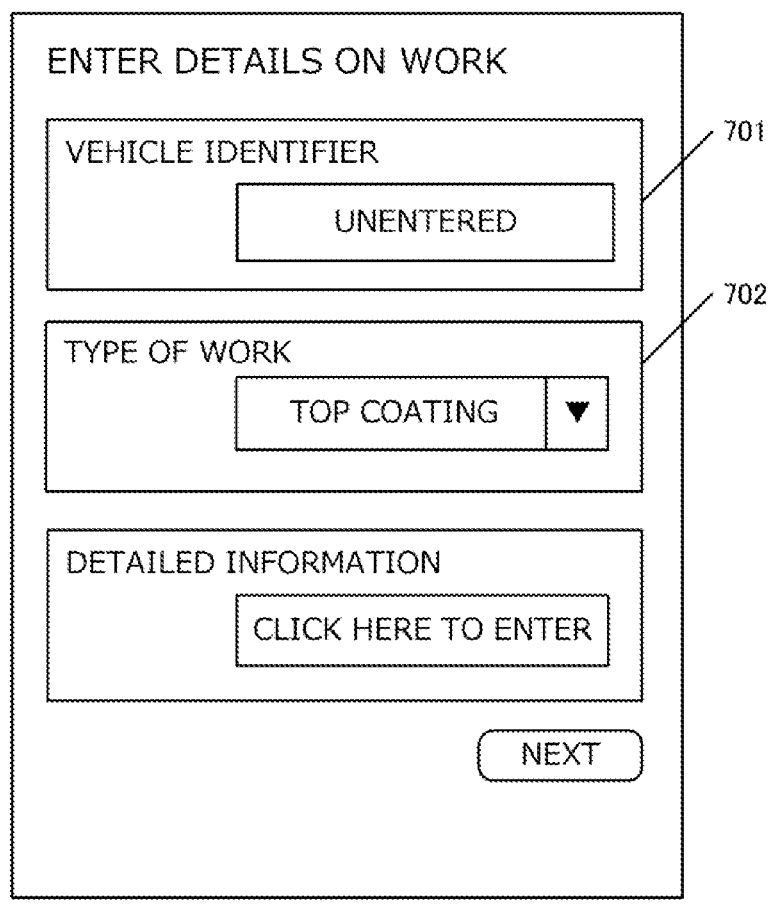
FIG. 7 is an example of a screen provided by the service location server.

In Step S12, information on the details of the coating operation is acquired. In this step, for example, the vehicle identifier and the type of work are acquired. The type of work is, in this example, any one of "top coating (of coating)," "removal (of top coating)," and "repair (of top coating)". These pieces of information may be entered on a screen, such as the one illustrated in FIG. 7. In the example illustrated in FIG. 7, the reference numeral 701 is a GUI component for inputting a vehicle identifier. The reference numeral 702 is a GUI component for selecting a type of work.

In Step S13, whether the type of work is any one of "top coating," "removal of coating," and "repair of coating".

If the type of work is top coating, the processing proceeds to Step S14.

In Step S14, detailed information on the top coating is acquired and operation data is generated. In this step, the number of layers formed upon top coating, and detailed information on the paint corresponding to each layer, for example, are acquired. These pieces of information may be entered, for example, on a screen such as the one illustrated in FIG. 8. For example, FIG. 8A illustrates examples entered when a transparent removable layer, a base layer, and then a clear layer are provided. FIG. 8B illustrates examples entered when a removable layer, a base layer that has different two colors, and then a clear layer are provided. In this way, detailed information for each layer can also be input. In this step, the data acquisition unit 2011 generates operation data based on such information.

If the type of work is coating removal, the processing proceeds to Step S15.

In Step S15, detailed information on coating removal is acquired and operation data is generated. In this step, for example, operation data for notifying that the uppermost layer has been removed by a predetermined means is generated. The predetermined means is, for example, high-pressure water flow or manual work. The operation data may include the name of equipment that was used for removal and a set value of water pressure.

If the type of work is repair of coating, the processing proceeds to Step S16.

In Step S16, detailed information on coating repair is acquired and operation data is generated. In this step, information on the part that was repaired, the method of repair, and the like is acquired.

The repaired part is the information used to identify the part that has been repaired, such as hood, roof, fenders, doors, and quarters. The method of repair is, for example, "repair only the top-coated layer", "repair the upper and lower layers at the same time", or "remove the top coating and then recoat".

The notification data or operation data generated by the service location server 200 is sent to the management server 100 and processed in the data updating unit 1011.

Figure 9:
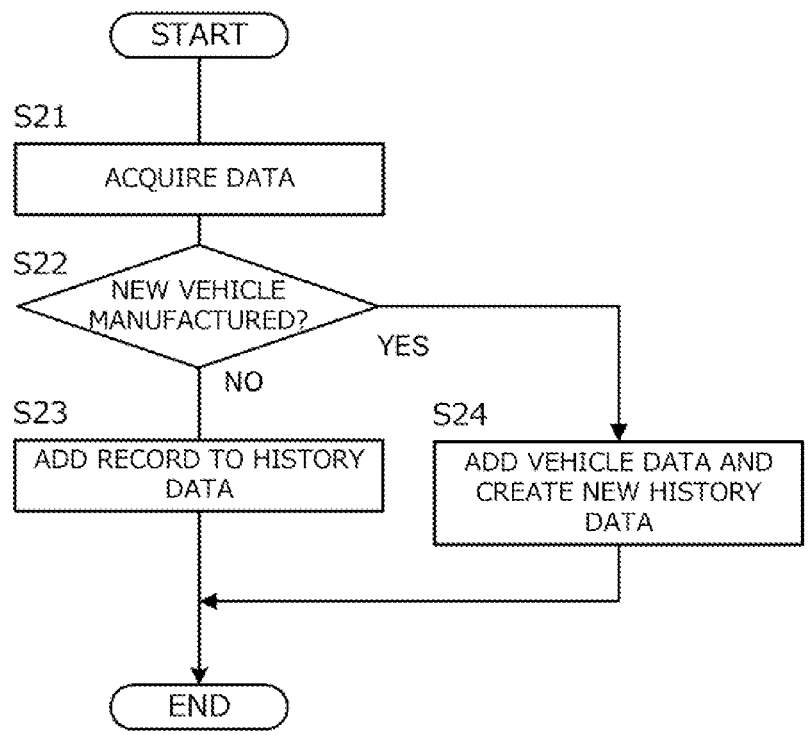
FIG. 9 is a flowchart of processing executed by the management server.

FIG. 9 is a flowchart of processing executed by the management server 100 (data updating unit 1011) for updating the data base.

First, in Step S21, the notification data or operation data sent from the service location server 200 is acquired.

Next, in Step S22, whether the target vehicle is a newly manufactured one or not is determined. For example, if the data received in Step S21 is notification data, it can be determined that the target vehicle is a newly manufactured one.

If negative determination is made in this step, the processing proceeds to Step S23. If positive determination is made in this step, the processing proceeds to Step S24.

In Step S23, the history data 102B corresponding to the vehicle is identified by referring to the vehicle data 102A, and the history related to the coating operation represented by the operation data is added to the history data. In other words, a new record consisting of the date of operation, vehicle service location, orderer, type of work, and detailed information on the coating is added. When the update of the data base is completed, the service location server 200 may be notified of that fact.

When the processing proceeds to Step S24, the vehicle is not supposed to be in the data base. In this case, the data updating unit 1011 adds a new record to the vehicle data 102A and generates history data 102B corresponding to the vehicle.

The processing described above updates the data base held by the management server 100.

The function of referring to the data base held by the management server 100 will now be described.

In response to a request sent from the user terminal 300 (hereinafter referred to as "history request"), the management server 100 can search for and provide the coating history of the vehicle under management.

Figure 10:
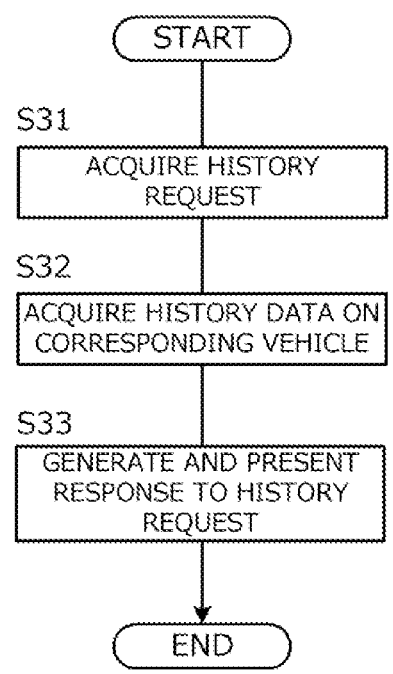
FIG. 10 is a flowchart of processing executed by the management server in the first embodiment.

FIG. 10 is a flowchart of the processing for searching for a coating history. The processing illustrated in the drawing is initiated by the information providing unit 1012 at the time when the user terminal 300 sends a history request.

Figure 11:
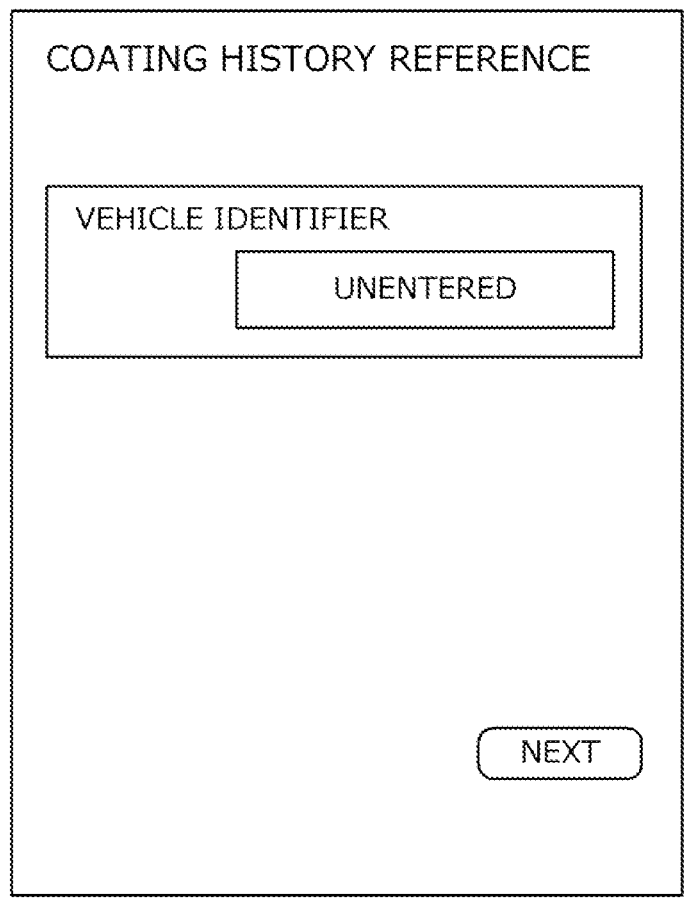
FIG. 11 illustrates an example of a screen for reference to a coating history in the first embodiment.

First, in Step S31, a history request sent from the user terminal 300 is received. The history request contains an identifier to uniquely identify the target vehicle. FIG. 11 is an example of a screen provided on the user terminal 300. The identifier may be, for example, entered on the screen shown in FIG. 11.

Next, in Step S32, the history data on the specified vehicle is acquired. To be specific, the vehicle data 102A is searched using the identifier of the specified vehicle as a key, and all the history data 102B corresponding to the vehicle is acquired.

Next, in Step S33, based on the vehicle data 102A and the history data 102B, the information to be presented to the user is generated and sent to the user terminal 300.

For example, the information providing unit 1012 generates a screen for explaining the date of operation, type of work, the outline of the coating operation, and the like and provides it to the user terminal 300. FIG. 12A illustrates an example of a screen generated based on the history data 102B. The screen preferably shows the details on the coating operation in chronological order. This allows the user to recognize the history of the coating on the target vehicle. Note that the screen may also show the current vehicle body color (i.e., the color of the currently exposed coating film) and the coating state (e.g., whether the currently exposed coating film is made of easily removable paint or not).

As explained above, in the vehicle management system according to the first embodiment, the management server 100 creates a data base of the history of coating operation with the easily removable paint for multiple vehicles under management, and updates this data base based on the operation data. Hence, a record of when the top coating was applied and when the top coating was removed for a predetermined vehicle.

In addition, in response to inquiries, the data base is searched and the acquired coating history is provided. This enables the user to accurately recognize the condition and value of the vehicle. Also, since whether or not the current coating of the vehicle is made of the easily removable paint can be indicated, information used to avoid coating-related troubles (for example, whether or not a high-pressure washer can be used) can be provided.

Modification of First Embodiment

Although the details on the operation data are illustrated in FIG. 4 in the first embodiment, the operation data may contain images. The image may be an image showing the appearance of the vehicle viewed after the coating operation has been completed. If the coating operation is coating repair, the image may show the process of the repair.

The management server 100 may store the image contained in the operation data in the history data 102B. This allows the state of the vehicle at the time when the coating operation occurred to be recorded.

The stored images may be presented to the user in Step S33. For example, in the screen illustrated in FIG. 12A, when the user selects each history, the corresponding image may be displayed. FIG. 12B is an example of a displayed image. This allows the user to check the appearance of the vehicle at any point in the past.

Second Embodiment

In the first embodiment, the history of all coating operations performed since the vehicle was manufactured is stored in the data base. Meanwhile, if coating operation is performed outside authenticated vehicle service locations, its history may be missed. The second embodiment is an embodiment in which the management server 100 detects the fact that the current status of the target vehicle and the coating history stored in the data base are not consistent.

In the second embodiment, the service location server 200 (data acquisition unit 2011) further acquires data regarding the current status (hereinafter referred to as "status data") related to a vehicle to be worked on, and the status data is included in the operation data. FIG. 13 illustrates an example of the operation data in the second embodiment. Examples of situation data include:
(A) The vehicle body color before a top coating is applied.
(B) The vehicle body color after removal of the top coating.
(C) The vehicle body color of the lower layer confirmed when the top coating is repaired.

In the example illustrated in FIG. 13, the vehicle body color before top coating is used as the status data (reference numeral 1301). Here, the vehicle body color is supposed to be represented by a color code.

Figure 14:
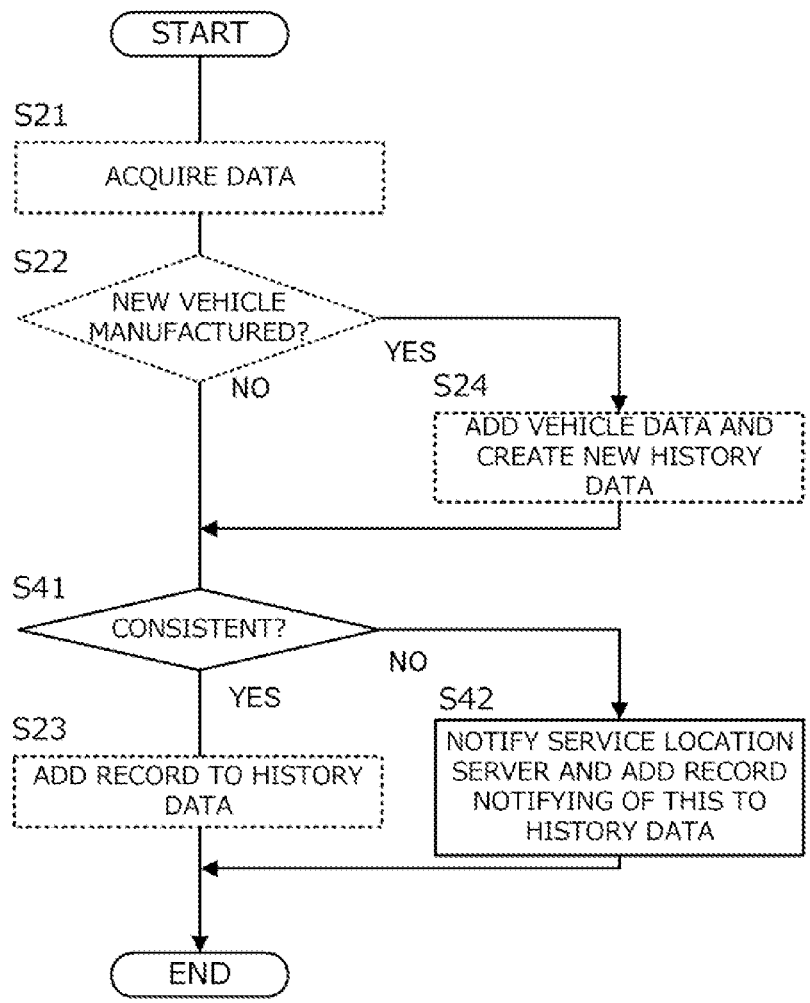
FIG. 14 is a flowchart of processing executed by the management server in the second embodiment.

In the second embodiment, the management server 100 (data updating unit 1011) refers to the status data included in the operation data and the history data 102B of the corresponding vehicle, and executes processing for checking whether there is any inconsistency between the two. FIG. 14 is a flowchart of processing executed by the management server 100 (data updating unit 1011) in the second embodiment. The steps indicated by dotted lines are the same as those in the first embodiment, and thus will not be explained.

In this embodiment, in Step S41, whether there is no inconsistency between the status data contained in the received operation data and the history data 102B corresponding to the vehicle is determined. In this step, for example, when any of the following cases occurs, it can be determined that there is an inconsistency between the two.
(1) When the type of work in the received operation data is "top coating" and the latest vehicle body color recorded in the history data is different from (A) mentioned above.
(2) When the type of work included in the received operation data is "removal", and the vehicle body color that is confirmed immediately before the last top coating is applied and that is recorded in the history data is different from (B) mentioned above.
(3) When the type of work included in the received operation data is "repair", and the vehicle body color that is confirmed immediately before the last top coating is applied and that is recorded in the history data is different from (C) mentioned above.

If no inconsistency is detected in Step S41, the processing proceeds to Step S23. In contrast, if an inconsistency is detected in Step S41, the processing proceeds to Step S42, and processing for recording the fact that an inconsistency has occurred is performed.

In Step S42, the data updating unit 1011 notifies the service location server 200 that the history data corresponding to the vehicle and the status data are not consistent. In addition, the data updating unit 1011 adds a record for identifying the time at which the inconsistency was detected, to the history data 102B.

Figure 15:
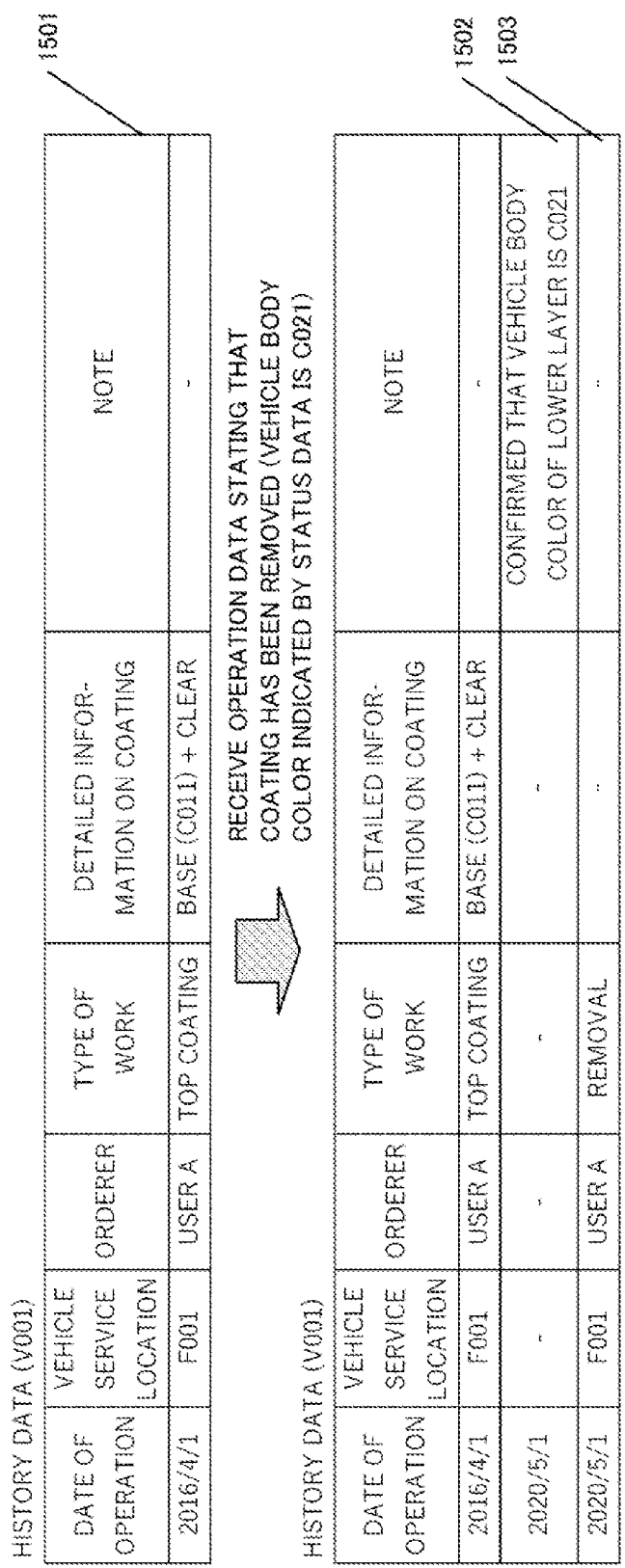
FIG. 15 is an example of history data in the second embodiment.

FIG. 15 is a diagram for explaining a record added in Step S42.

In this example, suppose that, with the history data indicated by the reference numeral 1501, the vehicle body color whose color code is C021 is confirmed after the coating is removed. In this case, the vehicle body color in the history is C011, so there is an inconsistency between the two. Accordingly, the data updating unit 1011 notifies the service location server 200 of that fact, and adds a record (reference numeral 1502) for identifying the time at which the inconsistency occurred, to the history data 102B. The record represents the fact that the history data prior to the record is incomplete (e.g., there is no record of a coating job with the color code C021). The reference numeral 1503 is a normal record that is added in response to a coating operation (removal of a top coating).

In the second embodiment, if such a record exists upon reference to the history, the guidance for showing that fact is provided to the user in Step S33. FIG. 16 is an example of a screen for providing the guidance of the history data illustrated in FIG. 15 to the user. For example, inserting the guidance shown by the reference numeral 1601 makes it possible to show that there is a period of time when the history is unknown.

Although the vehicle body color (color code) is used as the status data in this embodiment, the status data may also be an image or the like obtained by photographing the vehicle. In this case, the vehicle body color may be identified by analyzing the image, and determination may be made in Step S41 based on the identified vehicle body color. If there is any doubt about the determination, the user may be notified of that fact. In addition, comments obtained in response to this may be added to the data base.

(Modification)

The aforementioned embodiments are merely illustrative, and the present disclosure may be implemented with appropriate changes without departing from its spirit.

For example, the processing and units described in the present disclosure may be implemented in any combination as long as no technical inconsistency occurs.

In the description of the embodiments, the service location server 200 installed at a predetermined vehicle service location generates operation data; however, operation that does not require specialization, such as coating removal, may be performed by a user. In this case, a computer owned by the user (which may be a user terminal 300) may generate operation data and send it to the management server 100.

In addition, the processing described as being performed by one device may be shared and executed by a plurality of devices. Alternatively, the processing described as being performed by different devices may be executed by one device. In a computer system, what hardware configuration (server configuration) realizes each function can be flexibly changed.

The present disclosure can also be realized by supplying a computer program including the functions described in the above embodiments to a computer and causing one or more processors included in the computer to read and execute the program. Such a computer program may be provided to the computer by a non-transitory computer-readable storage medium connectable to a system bus of the computer, or may be provided to the computer via a network. Examples of non-transitory computer readable storage media include: any type of disk such as a magnetic disk (floppy (registered trademark) disk, hard disk drive (HDD), etc.), an optical disk (CD-ROM, DVD disk, Blu-ray disk, etc.); and any type of medium suitable for storing electronic instructions, such as read-only memory (ROM), random access memory (RAM), EPROM, EEPROM, magnetic cards, flash memory, and optical cards.

What is claimed is:

1. An information processing apparatus comprising a data base and a controller, wherein
the data base stores information about a color of a first coating film that a predetermined vehicle includes at a time of manufacture and a history of coating operation which includes at least any one of an operation of applying a second coating film including a removable layer on the first coating film of the vehicle, and an operation of removing the second coating film from the vehicle, in association with each other, and the controller is configured to:
acquire operation data representing details on the coating operation that is performed on the vehicle, the operation data including information about a color of the second coating film;
update the data base based on the operation data; and
output information about the color of the vehicle at the time of manufacture and information about a current color of the vehicle, based on the information stored in the data base.

2. The information processing apparatus according to claim 1, wherein
the operation data includes information on a composition of the second coating film.

3. The information processing apparatus according to claim 2, wherein
the second coating film includes multiple layers, and the operation data includes information on each layer.

4. The information processing apparatus according to claim 1, wherein
the data base further associates an identifier of the vehicle with a history of the coating operation that is performed on the vehicle since the vehicle is manufactured.

5. The information processing apparatus according to claim 4, wherein
the operation data further includes data regarding a current status of the vehicle prior to the coating operation, and
the controller determines whether or not the latest history associated with the vehicle is consistent with the current status of the vehicle.

6. The information processing apparatus according to claim 5, wherein
if the latest history associated with the vehicle is not consistent with the current status of the vehicle, the controller generates data notifying that.

7. The information processing apparatus according to claim 5, wherein
if the latest history associated with the vehicle is not consistent with the current status of the vehicle, the controller adds, for the vehicle, a record stating that the history of coating operation up to the present time is unknown, to the data base.

8. The information processing apparatus according to claim 1, wherein
the data base is data that is further associated with an identifier of a service location where the coating operation is performed.

9. The information processing apparatus according to claim 8, wherein
the data base stores data that is further associated with information on an orderer of the coating operation.

10. The information processing apparatus according to claim 8, wherein
the controller receives the operation data from a device corresponding to the service location.

11. The information processing apparatus according to claim 1, wherein
in response to an inquiry from an external device, the controller searches the data base for the history of the coating operation for a first vehicle and transmits the obtained results to the external device.

12. The information processing apparatus according to claim 11, wherein
the data base is data that is further associated with a photograph of the first vehicle after the coating operation.

13. The information processing apparatus according to claim 12, wherein
the controller also transmits the photograph of the first vehicle to the external device.

14. An information processing method comprising the steps of:
storing, in a data base, information about a color of a first coating film that a predetermined vehicle includes at a time of manufacture and a history of coating operation which includes at least any one of an operation of applying a second coating film including a removable layer on the first coating film of the vehicle and an operation of removing the second coating film from the vehicle, in association with each other;
obtaining operation data representing details on the coating operation performed on the vehicle, the operation data including information about a color of the second coating film;
updating the data base based on the operation data; and
outputting information about the color of the vehicle at the time of manufacture and information about a current color of the vehicle, based on the information stored in the data base.

15. The information processing method according to claim 14, wherein
the operation data includes information on a composition of the second coating film.

16. The information processing method according to claim 14, wherein
the data base further associates an identifier of the vehicle with a history of the coating operation that is performed on the vehicle since the vehicle is manufactured.

17. The information processing method according to claim 16, wherein
the operation data further includes data regarding a current status of the vehicle prior to the coating operation, and
the method further comprises the step of determining whether or not the latest history associated with the vehicle is consistent with the current status of the vehicle.

18. The information processing method according to claim 4, further comprising
the step of, in response to an inquiry from an external device, searching the data base for the history of the coating operation for a first vehicle and transmitting the obtained results to the external device.

* * * * *

UNITED STATES PATENT AND TRADEMARK OFFICE
CERTIFICATE OF CORRECTION

| | | |
|---|---|---|
| PATENT NO. | : 12,141,122 B2 | Page 1 of 1 |
| APPLICATION NO. | : 17/733202 | |
| DATED | : November 12, 2024 | |
| INVENTOR(S) | : Yukinori Il et al. | |

It is certified that error appears in the above-identified patent and that said Letters Patent is hereby corrected as shown below:

On the Title Page

(72) Inventors should read:
"Yukinori Il, Toyota (JP);
Kenji Yamaguchi, Miyoshi (JP);
Junya Ogawa, Okazaki (JP);
Yuki Naganuma, Nagoya (JP);
Junya Yamamoto, Seto (JP);
Yuta Tone, Nagoya (JP);
Naoki Ishizuka, Nagoya (JP);
Tadayuki Tanaka, Nagoya (JP);
Keisuke Ito, Okazaki (JP);
Yuka Yokoi, Miyoshi (JP);
Takashi Hayashi, Nagoya (JP);
Naoya Oka, Nagakute (JP);
Yu Hamada, Nagoya (JP)"

In the Claims

On Column 16, Line 52, Claim 18 should read:
"…claim 14, further comprising…"

Signed and Sealed this
First Day of April, 2025

Coke Morgan Stewart
*Acting Director of the United States Patent and Trademark Office*